Jan. 9, 1923. 1,441,826.
J. W. BIRELEY ET AL.
AUTOMOBILE LOCK.
FILED NOV. 29, 1919.
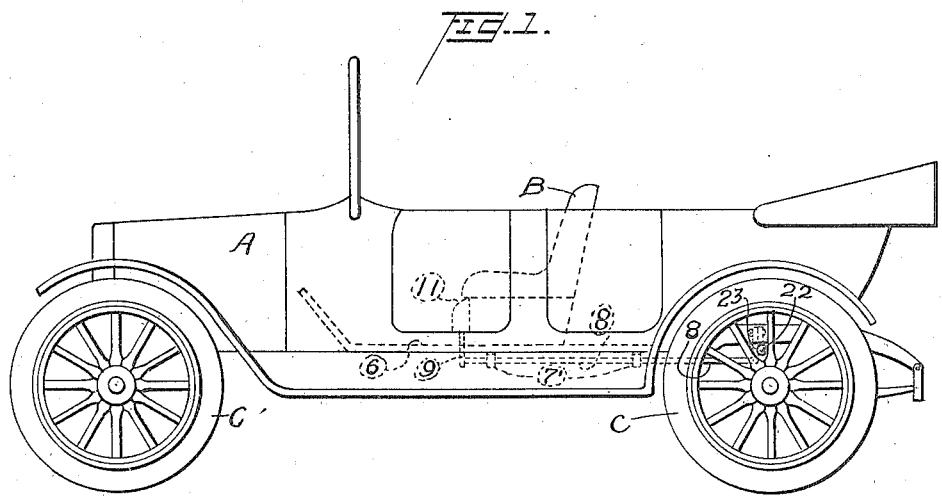
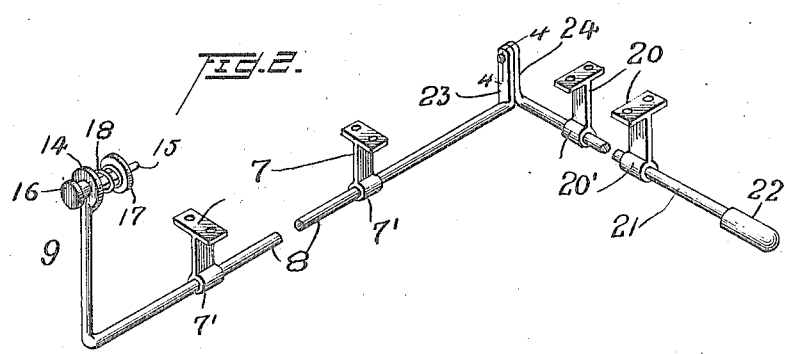
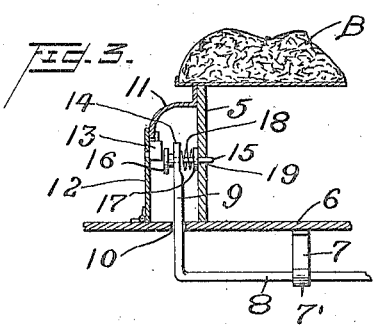
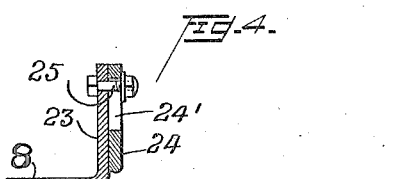
Inventors
J. W. Bireley
G. A. Walters
By A. M‌cIlreson
Attorney Patented Jan. 9, 1923.

1,441,826

UNITED STATES PATENT OFFICE.

JOSEPH W. BIRELEY AND GEORGE A. WALTERS, OF DETROIT, MICHIGAN.

AUTOMOBILE LOCK.

Application filed November 29, 1919. Serial No. 341,362.

*To all whom it may concern:*

Be it known that we, JOSEPH W. BIRELEY and GEORGE A. WALTERS, citizens of the United States of America, residing at Detroit, in the county of Wayne and State of Michigan, have invented certain new and useful Improvements in Automobile Locks, of which the following is a specification.

The present invention has particular reference to a lock peculiarly designed for attachment to an automobile whereby an arm is adapted to be projected into the space between adjacent spokes during the parking of the automobile to prevent the theft of the machine or the unauthorized use thereof.

A further object of the invention embodies the provision of improved lock devices to prevent rotation of the wheels of an automobile and being operable from the seat of the automobile.

With the above and other objects in view, the invention consists in the novel form, combination and arrangement of parts herein fully described and shown in the accompanying drawings, wherein like reference characters indicate similar parts throughout the several views.

In the drawing,

Figure 1 is a side elevational view of an automobile equipped with the present invention, Figure 2 is a detail perspective view of the present improved automobile lock removed from the automobile, Figure 3 is a fragmentary sectional view of the manually operable end of the lock and the adjacent portion of the automobile associated therewith, and Figure 4 is a cross sectional view taken on line 4—4 of Figure 2 showing the loose connection between the operating shaft and the projecting rod.

Briefly described, the present invention has particular reference to an automobile lock, and a lock of the type embodying a rod that is adapted to be projected from the body of the automobile into the space between the adjacent spokes and be retained in such position to prevent unauthorized use of the automobile. The invention comprises shiftable rods and bars supported upon the body of the automobile with the manually operable end thereof extending into a casing provided at the heelboard of one of the seats of the automobile, a key-operated door controlling access to the casing and operation of the lock mechanism.

Referring more in detail to the accompanying drawing, there is illustrated, an automobile A having a front seat B provided with the usual heelboard 5 as more clearly illustrated in Figure 3, while spoked wheels C of any preferred type are provided upon the automobile A.

The floor 6 of the automobile, at points spaced rearwardly of the heelboard 5 has depending brackets or hangers 7 secured to the bottom side thereof, and journaled in the lower ends 7' of said hangers is a horizontal rod 8 which extends beneath the floor 6 as illustrated in Figures 1 and 3. The forward end of the rod 8 has a right angle extension 9 freely projecting through the slot 10 in the floor 6 of the automobile directly in front of the heelboard 5 and said angle extension constitutes an operating handle for the rod 8 as will presently appear. A small casing 11 is arranged forwardly of the heelboard 5 for enclosing the operating handle 9, access being obtained to the casing 11 through the hinged door 12 controlled by the key lock 13. The upper end of the operating handle 9 is provided with a head 14 having a pin 15 slidably projecting therethrough and having a head 16 upon its outer end. A washer 17 is fixed to the inner end of the pin 15 inwardly of the handle head 14 with an expansion coil spring 18 surrounding the pin between the head 14 and washer 17 whereby the pin is normally projected in a direction toward the heelboard 5 and into a receiving opening 19 provided in the heelboard for said pin.

A second pair of hangers 20 is secured to the bottom 6 of the automobile with alined bearings 20' formed at the lower ends thereof and extending at right angles to the bearings 7' with an arm 21 slidable in said bearings 20' and having a buffer head 22 detachably connected to the outer end thereof. The adjacent ends of the rod 8 and the arm 21 carried by the right angle extensions 23 and 24 respectively, which angular extensions, when the arm 21 is retracted, are arranged in juxtaposition as illustrated in Figure 2. The operative connection between the rod 8 and arm 21 includes a bolt 25 carried by angular extension 23 and freely extending through the slot 24' formed in the arm extension 24.

In the normal position of the device, the arm 22 is normally retracted into the position illustrated in Figure 2 with the buffer 22 upon the rod normally projected beneath the body of the automobile A to permit a free movement of the automobile wheels C. When it is desired to park the machine and lock the same against unauthorized use, the door 12 of the casing 11 is opened by the key lock 13 and by pulling outwardly upon the pin head 16 against the tension of the spring 18, the pin 15 is removed from the opening 19 in the heelboard 5 with the handle 9 movable through the slot 10 for shifting the rod 8 in the bearings 7'. Such rotary motion of the rod 8 by the pin and slot connection between the angle extensions 23 and 24 of the rod 8 and arm 21, results in the projection of the rod 21 outwardly of the automobile with the buffer end 22 thereof received between adjacent spokes of the wheel C. and with a second opening in the heelboard 5 for the reception of the pin when the arm is in projected position, removal of said arm from the path of movement of said spokes is prevented with the result that the automobile is securely locked against unauthorized use or theft of the same. Also, by the employment of a felt or like buffer 22 upon the end of the rod arm 21, the surface of the wheel spokes will not be damaged in any way. While there is herein shown and described the preferred embodiment of the invention, it is nevertheless to be understood that minor changes may be made in the form, combination and arrangement of parts without departing from the spirit and scope of the invention as hereinafter claimed.

What is claimed as new is:—

In a locking device for automobiles, the combination with the front seat, heelboard and floor board of the automobile, of a rotatable shaft supported longitudinally beneath the floor board, a transversely sliding rod mounted adjacent the rotatable shaft, a pivotal connection between the adjacent ends of the shaft and rod, an operating arm upon the opposite end of said rotatable shaft and projecting through a transverse slot in said floor board, rotary movement of the longitudinal shaft causing the transverse shaft to reciprocate for projection between the spokes of a wheel, means for locking the operating arm in a perpendicular position, and a casing for said operating arm supported upon the heel and floor board of said automobile, said casing having a locking swinging door member whereby when the same is in a locked position unauthorized access to the operating arm will be prevented.

In testimony whereof we affix our signatures.

JOSEPH W. BIRELEY.
GEORGE A. WALTERS.